(12) United States Patent
Ikeda et al.

(10) Patent No.: US 10,427,720 B2
(45) Date of Patent: Oct. 1, 2019

(54) FRONT PORTION STRUCTURE FOR VEHICLE

(71) Applicant: TOYOTA JIDOSHA KABUSHIKI KAISHA, Toyota-shi, Aichi-ken (JP)

(72) Inventors: Akihiko Ikeda, Miyoshi (JP); Fumiaki Shigematsu, Gamagori (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/858,470

(22) Filed: Dec. 29, 2017

(65) Prior Publication Data

US 2018/0201327 A1 Jul. 19, 2018

(30) Foreign Application Priority Data

Jan. 13, 2017 (JP) .................................. 2017-003937

(51) Int. Cl.
  *B62D 21/15* (2006.01)
  *B62D 25/20* (2006.01)
  (Continued)

(52) U.S. Cl.
  CPC ............ *B62D 25/2018* (2013.01); *B60K 5/02* (2013.01); *B60K 5/04* (2013.01); *B62D 21/152* (2013.01);
  (Continued)

(58) Field of Classification Search
  CPC .... B62D 25/082; B62D 25/085; B62D 21/15; B62D 21/152; B62D 21/155; B60K 5/00;
  (Continued)

(56) References Cited

U.S. PATENT DOCUMENTS 5,251,932 A * 10/1993 Ide ..................... B60G 21/0551
                                                                180/427
6,298,936 B1 * 10/2001 Yoshida ............... B60K 5/1216
                                                                180/232
(Continued)

FOREIGN PATENT DOCUMENTS

EP     3 409 566      * 12/2018
JP     2003-026037 A    1/2003
(Continued)

OTHER PUBLICATIONS

U.S. Appl. No. 15/848,752, filed Dec. 20, 2017 in the name of Ikeda et al.

*Primary Examiner* — Emma K Frick
(74) *Attorney, Agent, or Firm* — Oliff PLC

(57) ABSTRACT

A front portion structure for a vehicle includes a powertrain unit and a suspension cross member. The suspension cross member includes a load receiving portion as a part of the suspension cross member in a width direction of the vehicle positioned above the other parts. The powertrain unit includes an abutting portion abutting against the suspension cross member when the powertrain unit moves backward during a front collision of the vehicle. The abutting portion is arranged on a lower side of a differential case of a differential device provided in a transaxle of the powertrain unit and at a position facing the load receiving portion of the suspension cross member.

3 Claims, 5 Drawing Sheets

(51) Int. Cl.
*B60K 5/02* (2006.01)
*B62D 25/08* (2006.01)
*B60K 5/04* (2006.01)
*B62D 25/02* (2006.01)
*B60R 21/02* (2006.01)
*B62D 21/11* (2006.01)

(52) U.S. Cl.
CPC ......... *B62D 21/155* (2013.01); *B62D 25/082* (2013.01); *B62D 25/085* (2013.01); *B60R 21/0286* (2013.01); *B60Y 2200/92* (2013.01); *B60Y 2306/01* (2013.01); *B62D 21/11* (2013.01); *B62D 25/025* (2013.01)

(58) Field of Classification Search
CPC ................... B60K 5/02; B60K 5/1275; B60R 2021/0004; B60Y 2306/01
See application file for complete search history.

(56) References Cited

U.S. PATENT DOCUMENTS

| | | | | |
|---|---|---|---|---|
| 6,779,420 | B2* | 8/2004 | Peura | B60K 23/0808 |
| | | | | 192/48.1 |
| 7,229,099 | B2* | 6/2007 | Reim | B62D 21/155 |
| | | | | 180/274 |
| 7,740,278 | B2* | 6/2010 | Kakuta | B62D 3/12 |
| | | | | 280/777 |
| 8,714,635 | B2* | 5/2014 | Tomozawa | B62D 21/155 |
| | | | | 296/193.09 |
| 8,894,134 | B2* | 11/2014 | Tomozawa | B60K 5/00 |
| | | | | 180/291 |
| 9,045,172 | B2* | 6/2015 | Gopal | B62D 21/11 |
| 9,505,444 | B2* | 11/2016 | Tsuchida | B62D 21/152 |
| 9,776,663 | B1* | 10/2017 | Craig | B62D 3/00 |
| 2006/0181071 | A1* | 8/2006 | Mitsui | B62D 21/155 |
| | | | | 280/784 |
| 2012/0212010 | A1 | 8/2012 | Tomozawa et al. | |
| 2018/0194406 | A1* | 7/2018 | Ikeda | B62D 25/085 |
| 2018/0208247 | A1* | 7/2018 | Ikeda | B62D 21/155 |
| 2019/0118863 | A1 | 4/2019 | Hara et al. | |

FOREIGN PATENT DOCUMENTS

| | | | |
|---|---|---|---|
| JP | 2009-101810 A | | 5/2009 |
| JP | 2012-153259 A | | 8/2012 |
| JP | 2013119313 | * | 6/2013 |
| JP | 2016-112956 A | | 6/2016 |
| JP | 2017-132371 A | | 8/2017 |

* cited by examiner

FRONT PORTION STRUCTURE FOR VEHICLE

INCORPORATION BY REFERENCE

The disclosure of Japanese Patent Application No. 2017-003937 filed on Jan. 13, 2017 including the specification, drawings and abstract is incorporated herein by reference in its entirety.

BACKGROUND

1. Technical Field

The present disclosure relates to a front portion structure for a vehicle and, more particularly, to structural improvement for further suppressing a backward movement of a powertrain unit during a front collision of a vehicle.

2. Description of Related Art

Known in the related art as disclosed in, for example, Japanese Unexamined Patent Application Publication No. 2016-112956 (JP 2016-112956 A) is a technique for allowing a powertrain unit (such as a unit that an engine, a transaxle, and so on constitute in a front engine front drive (FF) vehicle) to abut against a suspension cross member disposed behind the powertrain unit and extending along the width direction of a vehicle when the powertrain unit moves toward the rear of the vehicle (moves backward) due to the collision load applied to the power train unit during a front collision of the vehicle. The amount by which the powertrain unit moves backward is reduced by the technique being used.

Conceivable in a case where the amount by which the powertrain unit moves backward is reduced by the suspension cross member as described above is an abutting portion disposed in the powertrain unit and allowed to abut against the suspension cross member during the front collision of the vehicle.

FIG. 7 (schematic rear view illustrating a powertrain unit a) shows a case where an abutting portion c is disposed on a lower surface b of the powertrain unit a. FIG. 8 shows a case where an abutting portion c is disposed on a side surface d of a powertrain unit a.

In a case where the abutting portion c is disposed on the lower surface b of the powertrain unit a as in FIG. 7, the abutting portion c may interfere with a road surface and become damaged because of a decline in the minimum ground clearance of the powertrain unit a (because the minimum ground clearance of the powertrain unit a declines by a dimension t1 in FIG. 7 compared to a case where the abutting portion c is not disposed). In this case, a high height position needs to be set for the mounting of the powertrain unit a for its minimum ground clearance to be ensured. In a case where the abutting portion c is disposed on the side surface d of the powertrain unit a as in FIG. 8, the length dimension of the powertrain unit a as a whole (length dimension in the width direction of the vehicle) increases (length dimension in the width direction of the vehicle increases by a dimension t2 in FIG. 8 compared to a case where the abutting portion c is not disposed).

In a case where the abutting portion c is simply disposed on the outer surface (lower surface b or side surface d) of the powertrain unit a as described above, the abutting portion c protrudes from the outer surface b, d of the powertrain unit a (protrudes downward or to the side). Then, the mountability of the powertrain unit a deteriorates.

SUMMARY

The present disclosure provides a front portion structure for a vehicle that allows an abutting portion to be disposed in a powertrain unit and is capable of further suppressing deterioration of the mountability of the powertrain unit.

An aspect of the present disclosure relates to a front portion structure for a vehicle. The front portion structure includes a powertrain unit disposed in a front portion of the vehicle and a suspension cross member disposed behind the powertrain unit and extending along a width direction of the vehicle. The suspension cross member includes a load receiving portion as a part of the suspension cross member in the width direction of the vehicle. The load receiving portion is positioned above the other parts of the suspension cross member. The powertrain unit includes an abutting portion abutting against the suspension cross member when the powertrain unit moves backward during a front collision of the vehicle. The abutting portion is arranged on a lower side of a differential case of a differential device provided in a transaxle of the powertrain unit and at a position facing the load receiving portion of the suspension cross member.

According to the aspect of the present disclosure, the powertrain unit moves backward by receiving a collision load during the front collision of the vehicle. The abutting portion disposed in the powertrain unit abuts against the load receiving portion of the suspension cross member as a result of the backward movement of the powertrain unit and the backward movement of the powertrain unit is further suppressed as a result of load absorption by the suspension cross member. The abutting portion is arranged on the lower side of the differential case accommodating the differential device provided in the transaxle. In general, a differential device includes a differential ring gear and a differential case and the outer diameter dimension of the differential case is smaller than the outer diameter dimension of the differential ring gear. In other words, the lower side of the differential case is a dead space. According to the aspect of the present disclosure, the abutting portion is arranged on the lower side of the differential case in the dead space. In other words, although the abutting portion has a protruding dimension of zero or slightly protrudes from the lower surface of the powertrain unit and is arranged at a relatively high position, the backward movement of the powertrain unit can be further suppressed, by the abutting portion abutting well against the suspension cross member, as the part of the suspension cross member against which the abutting portion abuts is the load receiving portion (load receiving portion that is a part of the suspension cross member in the width direction of the vehicle and is positioned above the other parts). As described above, the abutting portion has a protruding dimension of zero or slightly protrudes from the lower surface of the powertrain unit (lower surface of the transaxle) with the backward movement of the powertrain unit during the front collision of the vehicle further suppressed. As a result, deterioration of the mountability of the powertrain unit can be further suppressed as no high height position needs to be set for the mounting of the powertrain unit and a decline in the minimum ground clearance of the powertrain unit can be further suppressed at the same time.

In the aspect of the present disclosure, the abutting portion of the powertrain unit abutting against the load receiving portion (load receiving portion that is a part of the suspension cross member in the width direction of the vehicle and is positioned above the other parts of the suspension cross member) of the suspension cross member during the front collision of the vehicle is arranged on the lower side of the differential case of the differential device provided in the transaxle of the powertrain unit and at the position facing the load receiving portion of the suspension cross member. Accordingly, the abutting portion has a protruding dimension of zero or slightly protrudes from the lower surface of the powertrain unit and a decline in the minimum ground clearance of the powertrain unit can be further suppressed. As a result, deterioration of the mountability of the powertrain unit can be further suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the present disclosure will be described with reference to accompanying drawings. In the following description of the present embodiment, the present disclosure is applied to a front engine front drive (FF) hybrid vehicle.

Schematic Structures of Powertrain Unit and Suspension Cross Member

Figure 1:
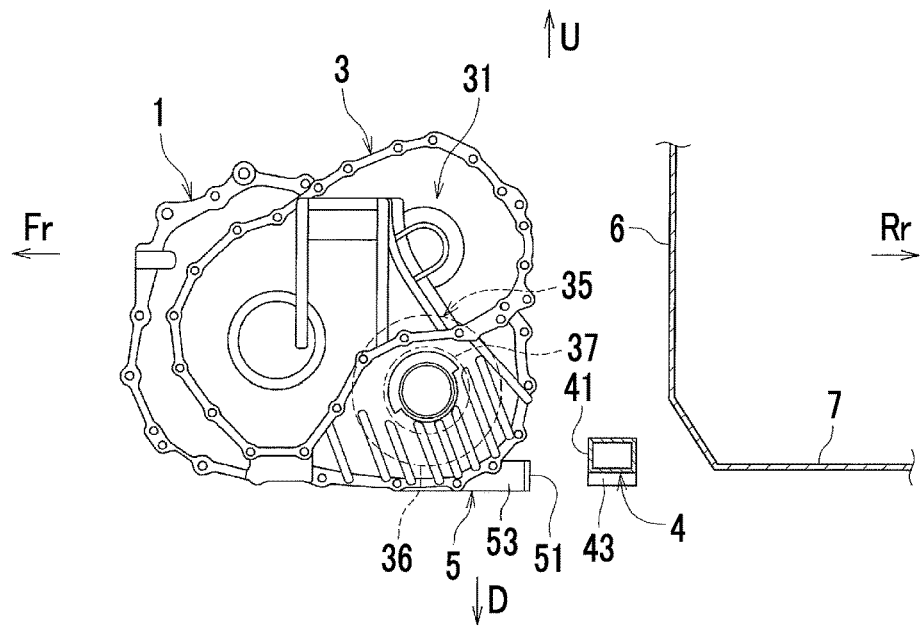
FIG. 1 is a side view illustrating the disposition layout of a powertrain unit and a suspension cross member of an embodiment.

FIG. 1 is a side view illustrating the disposition layout of a powertrain unit 1 and a suspension cross member 4 as front portion structures for a vehicle according to the present embodiment. The arrows Fr, Rr, U, and D that are shown in FIG. 1 represent the front, rear, top, and bottom of the vehicle, respectively. As illustrated in FIG. 1, the powertrain unit 1 and the suspension cross member 4 that is disposed behind the powertrain unit 1 and extends along the width direction of the vehicle are arranged in the front portion of the vehicle.

The powertrain unit 1 is a structure in which an engine 2 (refer to the virtual lines in FIGS. 2 and 3), a transaxle 3, and so on are integrally assembled.

Figure 2:
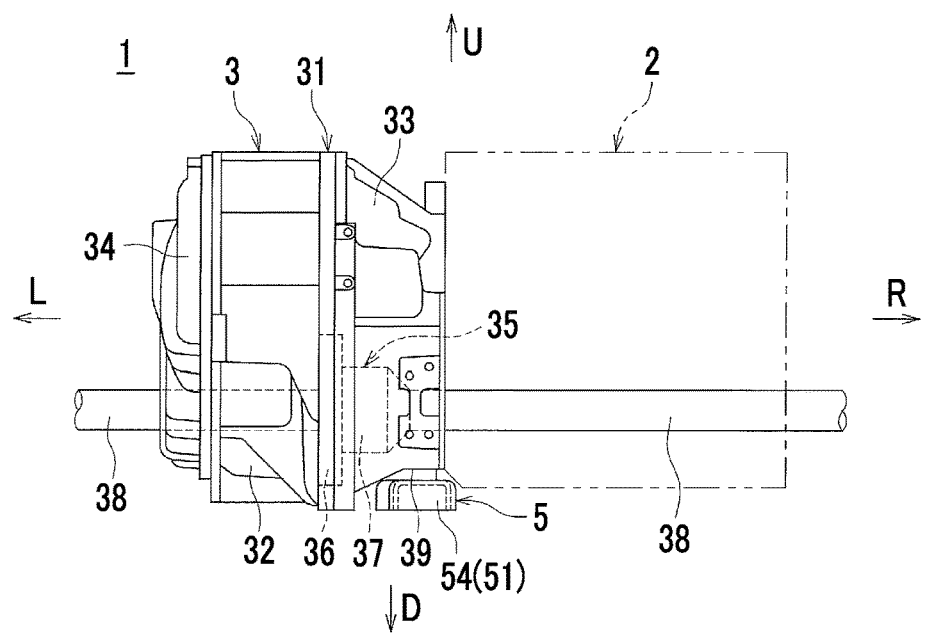
FIG. 2 is a rear view of the powertrain unit of the embodiment.
Figure 3:
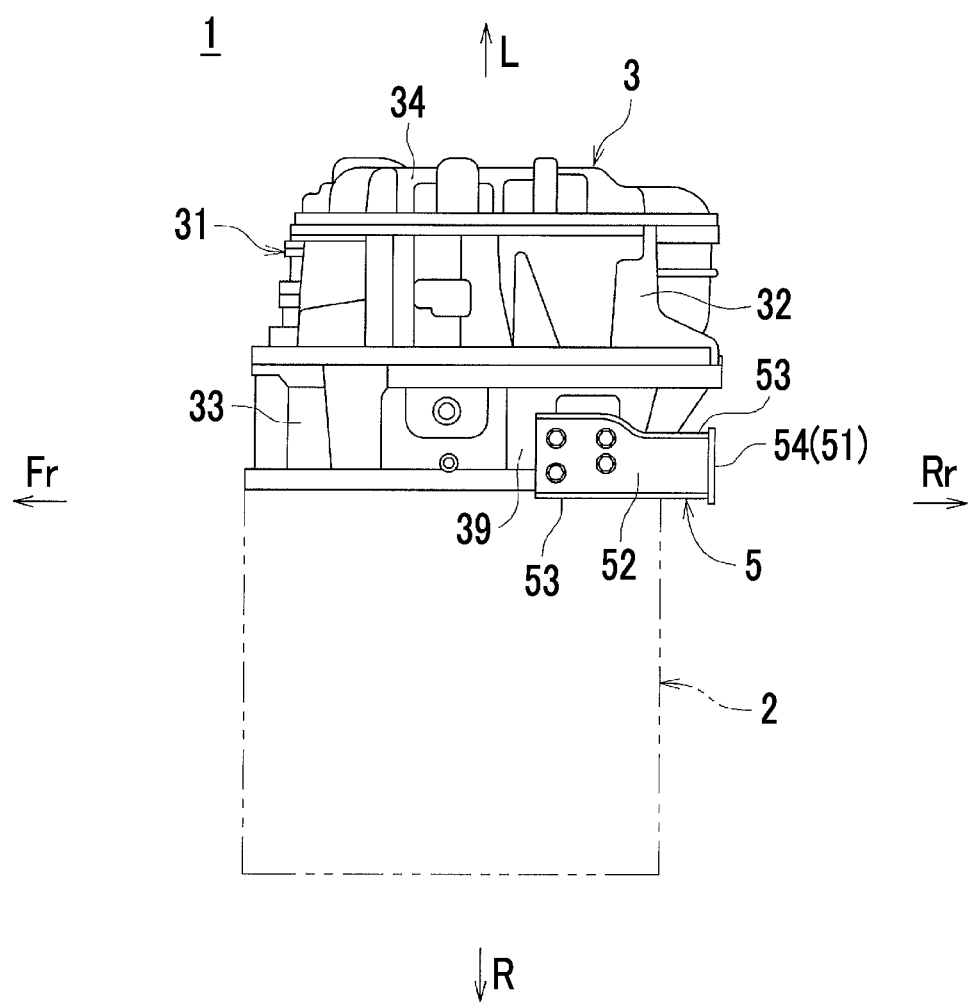
FIG. 3 is a bottom view of the powertrain unit of the embodiment.

FIG. 2 is a rear view of the powertrain unit 1 (diagram in which the powertrain unit 1 is viewed from the rear of the vehicle). FIG. 3 is a bottom view of the powertrain unit 1. The arrows Fr, Rr, U, D, R, and L that are shown in FIGS. 2 and 3 represent the front, rear, top, bottom, right side, and left side of the vehicle, respectively. As illustrated in FIGS. 2 and 3, a damper (not illustrated), a planetary gear (not illustrated), a motor for electric power generation (not illustrated), a motor for traveling and driving (not illustrated), a differential device 35, and so on are accommodated in a transaxle case 31 of the transaxle 3. The transaxle case 31 is a structure in which a transaxle case body 32, a transaxle housing 33, and a cover 34 are integrally assembled. The transaxle housing 33 is attached to a first side of the transaxle case body 32 (side on which the engine 2 is disposed). The cover 34 is attached to a second side of the transaxle case body 32 (side opposite to the side on which the engine 2 is disposed). The structure of the transaxle case 31 is not limited thereto.

The differential device 35 is provided with a differential ring gear 36 that meshes with a final drive gear (not illustrated) and a differential case 37 that accommodates a differential mechanism. The outer diameter dimension of the differential case 37 is set smaller than the outer diameter dimension of the differential ring gear 36. The differential device 35 is connected to drive wheels (front wheels, not illustrated) via drive shafts 38 and allows differential rotation of the drive wheels. The structure of the differential mechanism is known, and thus description thereof will be omitted herein.

The engine 2 is connected to the transaxle housing 33 as indicated by the virtual lines in FIGS. 2 and 3. A four-cylinder gasoline engine, for example, is adopted as the engine 2.

The engine 2 and the transaxle 3 constitute the powertrain unit 1 by being integrally assembled with each other as described above. The drive force of the engine 2 that is output from the crankshaft (not illustrated) of the engine 2 is input to the planetary gear via the damper. The drive force of the engine 2 input to the planetary gear is divided by the planetary gear and transmitted to the motor for electric power generation and the differential device 35.

The suspension cross member 4 is a vehicle body structure member for supporting the suspension devices of the drive wheels (front wheels). The suspension cross member 4 has a rectangular closed cross-sectional structure and a relatively high rigidity. The suspension cross member 4 is arranged in the lower portion of the space that is between the powertrain unit 1 and a dash panel (panel for partitioning between the engine compartment and the vehicle cabin) 6. The height position at which the suspension cross member 4 is arranged is set substantially to the height position of a floor panel 7 constituting the floor surface in the vehicle cabin.

Vehicle Front Collision Load Absorption Structure

Hereinafter, a structure for absorbing the collision load during a front collision of the vehicle, by which the present embodiment is characterized, will be described. The vehicle front collision load absorption structure is to reduce the amount by which the powertrain unit 1 moves backward by absorbing the collision load by allowing the powertrain unit 1 to abut against the suspension cross member 4 when the powertrain unit 1 moves toward the rear of the vehicle (moves backward) due to the collision load during the front collision of the vehicle.

Specifically, the amount by which the powertrain unit 1 moves backward is reduced by an abutting bracket 5, which is attached to the powertrain unit 1, abutting against the suspension cross member 4 during the front collision of the vehicle. This will be described in detail below.

Figure 4:
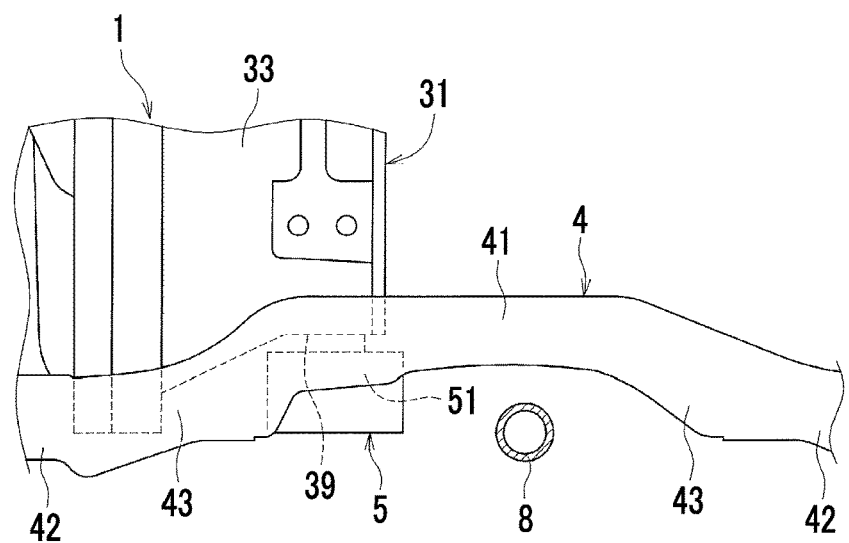
FIG. 4 is an enlarged view of a main part in which the disposition layout of an abutting bracket and the suspension cross member is seen from the rear of a vehicle.

A middle part 41 of the suspension cross member 4 in the width direction of the vehicle is positioned above both side parts 42 of the suspension cross member 4 in the width direction of the vehicle as illustrated in FIG. 4 (enlarged view of a main part in which the disposition layout of the abutting bracket 5 and the suspension cross member 4 is seen from the rear of the vehicle). In other words, both side parts 42 of the suspension cross member 4 in the width direction of the vehicle are positioned below to correspond to the axle positions of the front wheels as both side parts 42 of the suspension cross member 4 in the width direction of the vehicle are parts for supporting the suspension devices of the front wheels. The middle part 41 of the suspension cross member 4 in the width direction of the vehicle horizontally extends along the width direction of the vehicle to overlap the powertrain unit 1 in the front-rear direction of the vehicle. In this structure, both vehicle-width-direction side portions of the middle part 41 of the suspension cross member 4 in the width direction of the vehicle are continuous to both side parts 42 in the width direction of the vehicle via inclined parts 43 inclined downward toward the outer sides in the width direction of the vehicle. Accordingly, the middle part 41 of the suspension cross member 4 in the width direction of the vehicle is positioned above the other parts of the suspension cross member 4 and the middle part 41 of the suspension cross member 4 in the width direction of the vehicle is configured as the load receiving portion of the present disclosure (load receiving portion that is a part in the width direction of the vehicle and is positioned above the other parts). As illustrated in FIG. 4, an exhaust pipe 8 that extends along the front-rear direction of the vehicle is arranged on the lower side of the middle part 41 of the suspension cross member 4 in the width direction of the vehicle. Hereinafter, the middle part 41 of the suspension cross member 4 in the width direction of the vehicle will be referred to as a load receiving portion 41.

A recessed portion 39 is disposed in the lower surface of the transaxle housing 33 constituting the transaxle case 31. The recessed portion 39 is formed on the lower side of the differential case 37 of the differential device 35 accommodated in the transaxle case 31 (refer to FIG. 2). In other words, the recessed portion 39 is formed by the lower surface of the transaxle housing 33 being recessed upward by the space on the lower side of the differential case 37 being used as the outer diameter dimension of the differential case 37 is set smaller than the outer diameter dimension of the differential ring gear 36 as described above. The position at which the recessed portion 39 is formed is set to a position facing the load receiving portion 41 of the suspension cross member 4.

The abutting bracket 5 is disposed inside the recessed portion 39. The abutting bracket 5 abuts against the suspension cross member 4 when the powertrain unit 1 moves backward during the front collision of the vehicle. In other words, the abutting bracket 5 is arranged at the position facing the load receiving portion 41 of the suspension cross member 4 by being arranged inside the recessed portion 39.

The abutting bracket 5 is formed by a metallic plate material being folded as illustrated in FIG. 3. Specifically, the abutting bracket 5 is provided with a base plate portion 52, side plate portions 53, and an abutting plate portion 54. The base plate portion 52 is bolted to the lower surface of the transaxle housing 33 (bottom surface of the recessed portion 39). The side plate portions 53 are bent downward from both sides of the base plate portion 52 (both sides in the width direction of the vehicle). The abutting plate portion 54 is bent downward from the end portion of the base plate portion 52 that is on the rear side of the vehicle. The width dimension of the abutting plate portion 54 (dimension in the width direction of the vehicle) is set slightly larger than the dimension between the respective outer side surfaces of the side plate portions 53. The rear face of the abutting plate portion 54 is an abutting surface 51 that is capable of abutting against the load receiving portion 41 of the suspension cross member 4. Accordingly, the abutting bracket 5 constitutes the abutting portion of the present disclosure (abutting portion that is a part abutting against the suspension cross member when the powertrain unit moves backward during the front collision of the vehicle and is arranged on the lower side of the differential case of the differential device provided in the transaxle of the powertrain unit and at the position facing the load receiving portion of the suspension cross member).

In a state where the abutting bracket 5 is bolted to the bottom surface of the recessed portion 39, the lower end position of the abutting bracket 5 is substantially at the same height position as the lower end position of the transaxle case 31 (refer to FIGS. 1 and 2). In other words, the height dimension of the abutting bracket 5 is substantially equal to the recess dimension of the recessed portion 39, and the abutting bracket 5 does not protrude from the lower surface of the transaxle case 31 in this structure as a result.

In a state where the abutting surface 51 of the abutting bracket 5 and the load receiving portion 41 of the suspension cross member 4 face each other with the abutting bracket 5 bolted to the bottom surface of the recessed portion 39 as described above, the upper region of the abutting surface 51 of the abutting bracket 5 and the lower region of the load receiving portion 41 of the suspension cross member 4 face each other. This is a configuration to obtain a large abutting area between the abutting surface 51 of the abutting bracket 5 and the load receiving portion 41 of the suspension cross member 4 moving downward in view of the slight downward movement of the suspension cross member 4 during the front collision of the vehicle that will be described later. Accordingly, the relationship between the height position of the abutting surface 51 of the abutting bracket 5 and the height position of the load receiving portion 41 of the suspension cross member 4 is appropriately set based on an experiment or simulation in view of the amount by which the suspension cross member 4 moves downward during the front collision of the vehicle.

Operation During Front Collision of Vehicle

Hereinafter, an operation during the front collision of the vehicle will be described.

Figure 5:
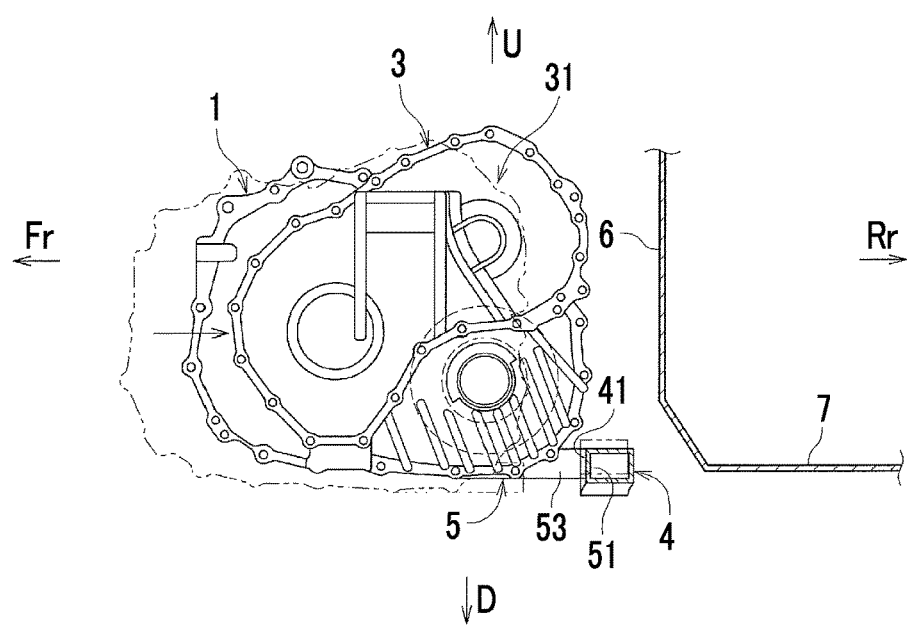
FIG. 5, which is equivalent to FIG. 1, is a diagram illustrating a state where the powertrain unit abuts against the suspension cross member during a front collision of the vehicle.

The collision load acts on the powertrain unit 1 during the front collision of the vehicle. As a result, the powertrain unit 1 moves backward as illustrated in FIG. 5. At this time, the suspension cross member 4 undergoes the slight downward movement as deformation of the front portion of the vehicle body. The virtual line that is shown in FIG. 5 indicates a state where the suspension cross member 4 is yet to move downward.

The abutting bracket 5 abuts against the load receiving portion 41 of the suspension cross member 4 as a result of the backward movement of the powertrain unit 1 and the backward movement of the powertrain unit 1 is further suppressed as a result of load absorption by the suspension cross member 4. At this time, the suspension cross member 4 moves to the lower side as the upper region of the abutting surface 51 of the abutting bracket 5 and the lower region of the load receiving portion 41 of the suspension cross member 4 already face each other as described above (refer to FIG. 1). As a result, a large abutting area can be obtained between the abutting surface 51 of the abutting bracket 5 and the load receiving portion 41 of the suspension cross member 4 and a significant effect can be achieved in further suppressing the backward movement of the powertrain unit 1.

As described above, the abutting bracket 5 is arranged at the position facing the load receiving portion 41 of the suspension cross member 4 inside the recessed portion 39 disposed in the lower surface of the powertrain unit 1. In other words, the abutting bracket 5 is arranged on the lower side of the differential case 37 of the differential device 35 provided in the transaxle 3 and is arranged by the dead space on the lower side of the differential case 37 being used. Accordingly, the abutting bracket 5 has a protruding dimension of zero from the lower surface of the powertrain unit 1 and is arranged at a relatively high position. However, the backward movement of the powertrain unit 1 can be further suppressed, by the abutting bracket 5 abutting well against the suspension cross member 4, as the part of the suspension cross member 4 against which the abutting bracket 5 abuts is the load receiving portion (load receiving portion that is a part of the suspension cross member 4 in the width direction of the vehicle and is positioned above the other parts) 41. As described above, the abutting bracket 5 is capable of having a protruding dimension of zero from the lower surface of the powertrain unit 1 (lower surface of the transaxle 3) with the backward movement of the powertrain unit 1 during the front collision of the vehicle further suppressed. As a result, deterioration of the mountability of the powertrain unit 1 and interference of the abutting bracket 5 with a road surface can be further suppressed at the same time as no high height position needs to be set for the mounting of the powertrain unit 1 and a decline in the minimum ground clearance of the powertrain unit 1 can be further suppressed.

Modification Example

A modification example will be described below. The structure of the abutting bracket according to this modification example differs from the structure of the abutting bracket according to the embodiment. The rest of the structure and the operation are similar to those of the embodiment, and thus simply the structure of the abutting bracket will be described below.

Figure 6A:
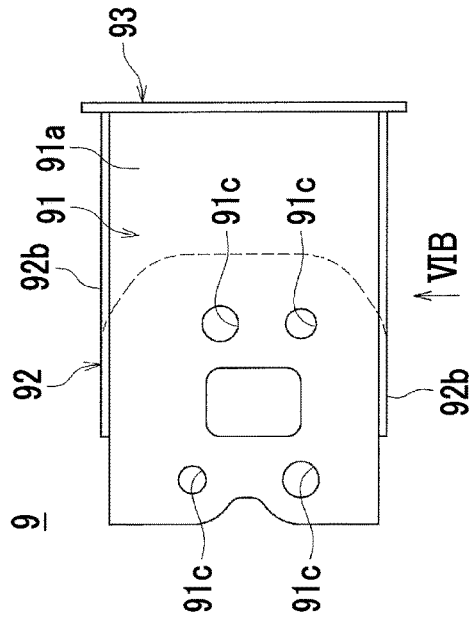
FIG. 6A is a plan view of an abutting bracket of a modification example.
Figure 6C:
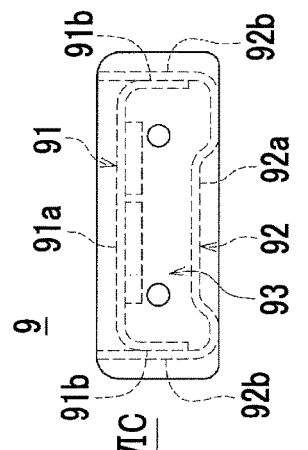
FIG. 6C is a VIC arrow view of FIG. 6B.
Figure 6B:
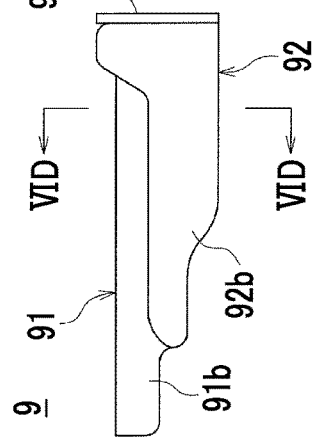
FIG. 6B is a VIB arrow view of FIG. 6A.
Figure 6D:
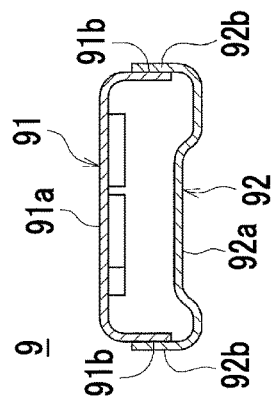
FIG. 6D is a cross-sectional view taken along line VID-VID of FIG. 6B.
Figure 7:
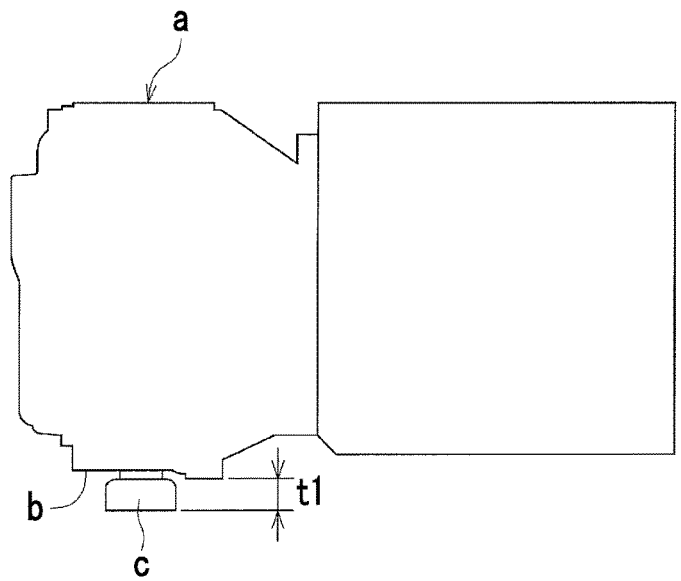
FIG. 7 is a schematic rear view illustrating a powertrain unit for describing a problem in a case where an abutting portion is disposed on a lower surface of a powertrain unit.
Figure 8:
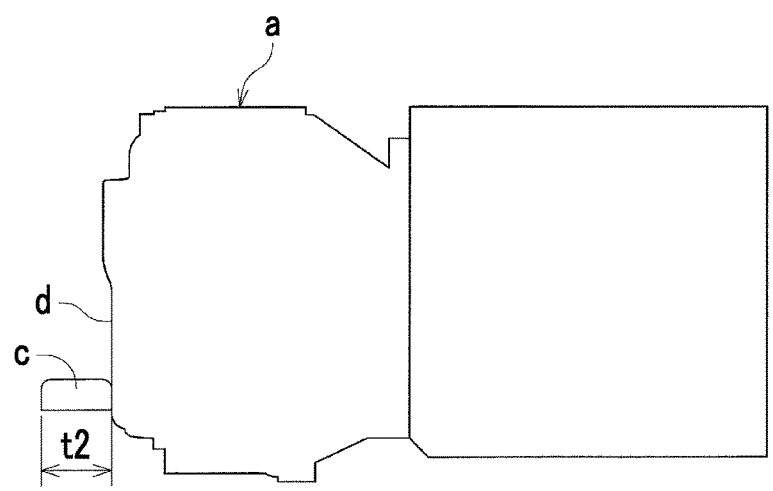
FIG. 8 is a schematic rear view illustrating a powertrain unit for describing a problem in a case where an abutting portion is disposed on a side surface of a powertrain unit.

FIG. 6A is a plan view of an abutting bracket 9 according to this modification example. FIG. 6B is a VIB arrow view of FIG. 6A. FIG. 6C is a VIC arrow view of FIG. 6B. FIG. 6D is a cross-sectional view taken along line VID-VID of FIG. 6B.

As illustrated in FIGS. 6A to 6D, the abutting bracket 9 according to this example is a structure in which an upper plate 91, a lower plate 92, and an abutting plate 93 are integrally joined by means such as welding. Each of the upper plate 91 and the lower plate 92 is formed by a metallic plate material being folded. Specifically, the upper plate 91 and the lower plate 92 are provided with base plate portions 91*a*, 92*a* and side plate portions 91*b*, 92*b*, respectively. The side plate portions 91*b*, 92*b* are bent from both sides of the base plate portions 91*a*, 92*a* (both sides in the width direction of the vehicle in a state where the base plate portions 91*a*, 92*a* are attached to the lower surface of the transaxle housing 33), respectively. The gap dimension between the respective outer side surfaces of the side plate portions 91*b* of the upper plate 91 is substantially equal to the gap dimension between the respective inner side surfaces of the side plate portions 92*b* of the lower plate 92. The upper plate 91 and the lower plate 92 are integrally joined to each other with the inner side surfaces of the side plate portions 92*b* of the lower plate 92 overlapping the respective outer side surfaces of the side plate portions 91*b* of the upper plate 91.

In a state where the upper plate 91 and the lower plate 92 are joined to each other as described above, the tip edges of the upper plate 91 and the lower plate 92 (right end edges in FIGS. 6A and 6B) are on the same virtual plane and the abutting plate 93 is joined to the tip edges of the upper plate 91 and the lower plate 92. The width dimension of the abutting plate 93 (height dimension in FIGS. 6B and 6C) is equal to the height dimension of the tip edge of the lower plate 92.

Multiple bolt insertion holes 91*c* are formed in the upper plate 91. The abutting bracket 9 is bolted to the lower surface of the transaxle housing 33 (bottom surface of the recessed portion 39) by bolts being inserted into the bolt insertion holes 91*c*. The length dimension of the base plate portion 92*a* of the lower plate 92 (dimension in the right-left direction in FIGS. 6A and 6B) is set shorter than the length dimension of the upper plate 91 (refer to the dashed line in FIG. 6A), and thus the lower plate 92 does not hinder the insertion of the bolts into the bolt insertion holes 91*c*.

In this example, the height dimension of the abutting bracket 9 is substantially equal to the recess dimension of the recessed portion 39 as in the embodiment described above. Accordingly, as is the case with the embodiment described above, the abutting bracket 9 does not protrude from the lower surface of the transaxle case 31 in this structure.

The rest of the structure and the operation during the front collision of the vehicle are similar to those of the embodiment.

Other Embodiments

The present disclosure is not limited to the embodiment and the modification example. Every modification and application included in the scope of the claims and any scope equivalent to the scope of the claims are also possible.

In the structures of the embodiment and the modification example, the abutting bracket 5 (9) does not protrude from the lower surface of the transaxle case 31 by the height dimension of the abutting bracket 5 (9) being substantially equal to the recess dimension of the recessed portion 39. However, the present disclosure is not limited thereto. In an alternative structure, for example, the abutting bracket 5 (9) may not protrude from the lower surface of the transaxle case 31 by the height dimension of the abutting bracket 5 (9) being set shorter than the recess dimension of the recessed portion 39. In another alternative structure, the abutting bracket 5 (9) may slightly protrude from the lower surface of the transaxle case 31 with the height dimension of the abutting bracket 5 (9) set slightly larger than the recess dimension of the recessed portion 39 (structure in which the abutting bracket 5 (9) protrudes by a protrusion amount ensuring a minimum ground clearance at which no need for setting a high height position for the mounting of the powertrain unit 1 arises).

In the embodiment and the modification example, the load receiving portion 41 is formed by the middle part of the suspension cross member 4 in the width direction of the vehicle being positioned above the other parts. In the present disclosure, however, the position at which the load receiving portion 41 is formed is not limited to the middle part of the suspension cross member 4 in the width direction of the vehicle.

In the embodiment and the modification example, the abutting portion is configured by the abutting bracket 5 (9), which is a separate member from the powertrain unit 1, being bolted to the lower surface of the transaxle housing 33 (bottom surface of the recessed portion 39). However, the present disclosure is not limited thereto. The abutting portion may be formed integrally with the transaxle housing 33 as well.

According to the description of the embodiment and the modification example, the present disclosure is applied to the vehicle in which the gasoline engine 2 is mounted. However, the present disclosure is not limited thereto and can also be applied to a vehicle in which another internal combustion engine, such as a diesel engine, is mounted. In addition, the number of cylinders and the type of engine (V-type, horizontally-opposed, and so on) are not particularly limited.

According to the description of the embodiment and the modification example, the present disclosure is applied to the hybrid vehicle (vehicle in which the engine and the electric motor are mounted as its drive force sources). However, the present disclosure can also be applied to a conventional vehicle (vehicle in which an engine is mounted as its single drive force source).

In the embodiment and the modification example, the abutting bracket 5 is formed by the metallic plate material being folded and by the metallic plate material being integrated by welding. However, the present disclosure is not limited thereto. A resin material that has a needed strength, such as one based on fiber reinforced plastics (FRP) or casting, may constitute the abutting bracket 5 instead. As described above, methods for processing the abutting bracket 5 are not particularly limited.

The present disclosure is applicable to a front portion structure for a vehicle that further suppresses a backward movement of a powertrain unit by absorbing a load by allowing the powertrain unit to abut against a suspension cross member during a front collision of the vehicle.

In the present embodiment, the abutting portion may be an abutting bracket arranged inside a recessed portion in the lower surface of the transaxle. The lower surface of the transaxle is disposed on the lower side of the differential case.

In the present embodiment, the recessed portion is disposed in the lower surface of the transaxle case in the dead space. The lower surface of the transaxle is disposed on the lower side of the differential case. The abutting bracket (abutting portion) is arranged inside the recessed portion. With the present embodiment, deterioration of the mountability of the powertrain unit can be further suppressed by the abutting bracket having a protruding dimension of zero or slightly protruding from the lower surface of the powertrain unit.

In the present embodiment, the height dimension of the abutting bracket may be set equal to or smaller than the recess dimension of the recessed portion.

With the present embodiment, the abutting bracket is capable of having a protruding dimension of zero from the lower surface of the powertrain unit.

In the present embodiment, the suspension cross member may be arranged to move downward during the front collision of the vehicle. The upper region of the abutting portion of the powertrain unit and the lower region of the load receiving portion of the suspension cross member may face each other in a situation in which the vehicle is subjected to no front collision.

With the present embodiment, a large abutting area can be obtained between the abutting portion of the powertrain unit and the load receiving portion of the suspension cross member by the suspension cross member moving downward during the front collision of the vehicle. Accordingly, a significant effect can be achieved in further suppressing a backward movement of the powertrain unit.

What is claimed is:

1. A front portion structure for a vehicle, the front portion structure comprising:
a powertrain disposed in a front portion of the vehicle; and
a suspension cross member disposed behind the powertrain and extending along a width direction of the vehicle, the suspension cross member including a load receiving portion in the width direction of the vehicle, the load receiving portion being disposed at a highest point of the suspension cross member with respect to the vehicle, wherein:
the powertrain includes an abutting bracket configured to abut against the suspension cross member when the powertrain moves backward during a front collision of the vehicle, and
the abutting bracket is disposed on a lower side of a differential case of a differential device with respect to the vehicle, the differential device being provided in a transaxle of the powertrain and at a position facing the load receiving portion of the suspension cross member, the abutting bracket being disposed inside a recessed portion in a lower surface of the transaxle, the lower surface of the transaxle being disposed on the lower side of the differential case.

2. The front portion structure according to claim 1, wherein a height dimension of the abutting bracket is equal to or less than a recess dimension of the recessed portion.

3. The front portion structure according to claim 1, wherein the suspension cross member is configured to move downward during the front collision of the vehicle, and an upper region of the abutting bracket of the powertrain faces a lower region of the load receiving portion of the suspension cross member when the vehicle is not subjected to the front collision.

* * * * *